3,161,560
EXTRUSION COATED PAPER AND METHOD OF
MAKING THE SAME
Leon J. Paquin and Owen D. Mosher, Glens Falls, and Glenn M. Violette, Greenwich, N.Y., assignors to International Paper Company, New York, N.Y., a corporation of New York
Filed Jan. 4, 1961, Ser. No. 80,584
8 Claims. (Cl. 161—250)

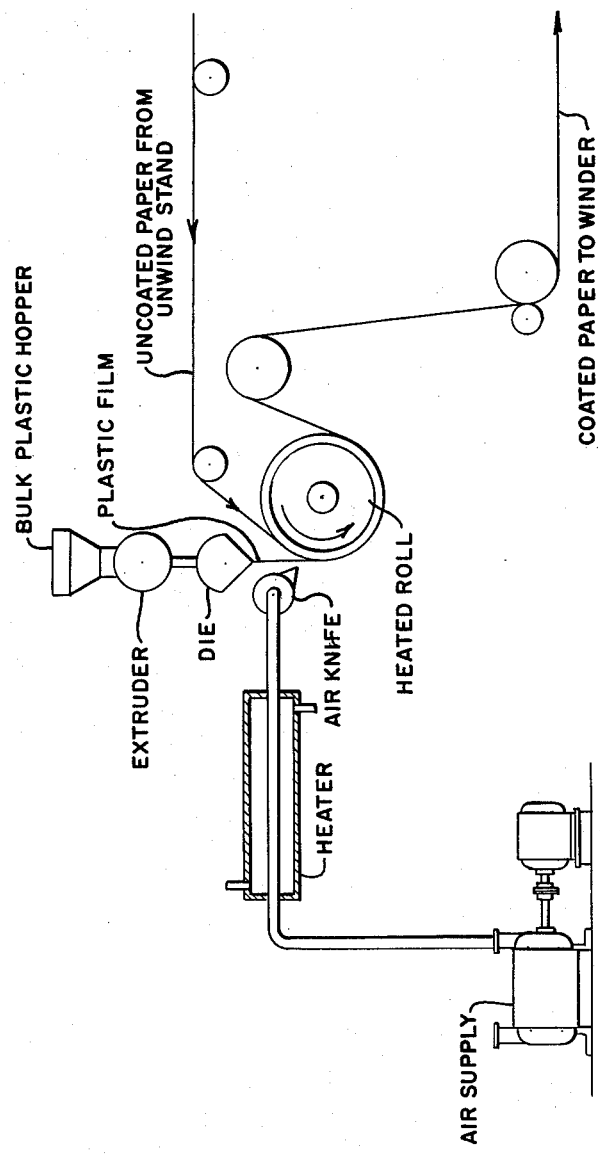

This invention relates to an improved method of coating paper with polymers and copolymers of olefins. More particularly, it relates to a method of producing polyolefin coated paper having heightened resistance, i.e., improved barrier properties, to the passage of gases such as water vapor and solvents such as fats and oils.

The extrusion of molten polymers and copolymers of the lower olefins, e.g., propylene, ethylene, and butylene, onto a moving paper web is a well developed industry a little over twelve years old. In these twelve years, the uses for the coated papers have multiplied steadily, so that, today, such varied products as ice cream and dynamite, candy and batteries, frozen foods, fresh produce, fertilizers, other papers including the photo-sensitive, sugar, bulk chemicals, and animal cages are being contained or lined thereby.

The coating of a polyolefin, such as polyethylene, upon paper is usually accomplished by passing the extruded polyethylene film and the paper simultaneously between two pressure rolls and, thereby, bonding the hot film thoroughly to the paper. One of the pressure rolls is usually rubber-covered and is shielded by the paper web. The other of the pressure rolls is conventionally metal-covered, e.g., chrome-plated, and serves to secure the release of the hot extruded polyethylene film. In this regard, it has been found that the use, on the premise that their excellent release properties are well-known, of a hot pressure roll having a silicone rubber or Teflon (a commercially available tetrafluorethylene plastic) covering in place of the high cooling capacity chrome-plating does not successfully prevent the sticking of the hot extruded polyethylene to such pressure roll and the resultant production-halting breaking of the paper web. It has also been found that, even at relatively low speeds, the polyethylene film that forms the paper coating must be chilled from extruding temperatures of from about 260° to 315° C. to near room temperatures by the chrome-plated roll in a fraction of a second in order to release therefrom. It appears, therefore, that shock cooling is a requisite of the successful coating of paper with polyolefins. Perhaps for this reason, the industry has been or is unaware of the problem created by this step or has tended to ignore it.

A brief analysis of the nature of polyolefins, using polyethylene as a typical example, is necessary to a proper understanding of what the problem is. Polyethylene molecules are either linear or side-chained and compositions containing them are readily identifiable by their molecular weights, molecular weight distributions, densities, percentages of chain branchings, and melt indices. Polyethylenes made by low temperature, low pressure catalytic processes tend to contain higher percentages of linear molecules and, because such molecules lend themselves to the growth of compact, dense crystals as the polymers cool and solidify, they are known as linear or high density polyethylenes. Linear polyethylenes are from about 90% to 95% crystalline in structure with an amorphous remainder. Polyethylenes made by high pressure, high temperature processes tend to contain higher percentages of side-chained molecules and, because such molecules do not lend themselves to the growth of crystals as the polymers cool and solidify, they are only from about 60% to 70% crystalline with an amorphous remainder. The linearity of the molecules, then, is a factor in the crystallinity and the density of the solids they compose. It is not, however, the sole factor, so that, if it were possible to produce purely linear polyethylene with no molecules having side chains, it would be conceivable that the polymer would pass from being 100% amorphous when melted to being 100% crystalline and having a maximum density of 1.0 when cooled to a solid form. The thermal history of a polyethylene is also relevant and, if such thermal history is unfavorable to the growth of crystals therein, the solid will have a diminished crystallinity and density. It is typical, for instance, for a polyethylene having a high density in the range of 0.945 to 0.950 when supplied to lose such density appreciably, i.e., down to 0.930 to 0.938, when coated on paper by known extrusion methods. Polyethylenes of medium density (0.925 to 0.940) and of low density (0.918 to 0.925) show similar, if less dramatic, losses. Hence, it is on account of at least these two factors that all commercially available grades of solid polyethylenes are partly crystalline, partly amorphous mixtures having a density of less than 1.0. These densities are expressed in terms of grams per cubic centimeter in accordance with ASTM Test D792–50, Method B, or ASTM Test D1505–57T, as the case may be.

Practical consequences flow from the mixed character of solid polymers and copolymers of olefins. Where, for instance, a solid polyethylene has a high amorphous content, it has superior gloss, transparency, toughness, and elongation properties. Such properties are desirable in free films, but they have little or no value in captive films, e.g., paper coatings. As paper coatings, polyolefinic films have value almost only when they have good barrier properties, i.e., resistance to the passage of gases such as water vapor and solvents such as fats and oils, these agents being harmful either to the paper itself or to the products wrapped, covered, or contained thereby or, perhaps, being desirably prevented from escaping from the packaged goods out through the coated papers. Such barrier properties are, of course, a function of the density of the finished coated papers and, therefore, of the amount of crystallinity of the films coating the papers.

Short of seeking to produce purely linear polyethylenes capable of being 100% crystalline in the solid state, then, the most immediate solution to the problem of improving polyolefinic coating films and their barrier properties must be and has been taken to lie in the direction of affording the films the thermal history most favorable to crystal growth possible and, throughout their production and application, in maintaining, in preventing any decline in, in restoring any decline in, or even in a heightening of the amount of crystallinity in any of the polymers and copolymers with which one can coat paper. More particularly, it has been taken to lie in the direction of ascertaining any bad effects on the thermal history of such coating films of their being shock chilled to enable their release from the pressure roll bonding them and, thereafter, overcoming or at least mitigating such effects. So much, then, for the problem giving rise to and the objects satisfied by the present invention.

It has now been found that, in a continuous process of coating paper with a film of a compound selected from the group consisting of polymers and copolymers of lower olefins, the pressure rolls commonly employed to bond the film to paper can be eliminated, thereby reducing equipment purchase and maintenance costs, and that shock chilling to obtain film release from one of the pressure rolls can be eliminated, thereby affording the film a thermal history consonant with either an effort to obtain improved barrier properties for smaller amounts of film raw material or an effort to maintain at or improve to a point approaching the theoretical maximum barrier properties of a given amount of film material.

More particularly, it has been found that improved polyethylene film coated papers can be produced by applying the hot extruded film to the paper substrate pneumatically, i.e., by blowing a gas or vapor current or stream against one side of the film with sufficient force or at greater than atmospheric pressure to obtain a bond between the other side of the film and the paper substrate, and that this method is surprisingly effective for a broad range of coating weights and thicknesses, i.e., from about 1 to 30 pounds or about 0.07 to 2.0 mils, of polyethylene per ream of paper, though it is preferably employed to apply coating weights of from about 7 to 20 pounds or about 0.5 to 1.5 mils per ream, so as to avoid, on the one hand, the need for special care regarding the hazard of film pin-holing inherent in all methods of film application and to avoid on the other hand, the need for special gas or vapor stream propulsion equipment. Air, steam, and inert gases are suitable pneumatic means in the method of the present invention and it has been found that a conventional "air knife," commonly used in the pigment coating field, acceptably diverts the molten plastic film issuing from the extruder onto the substrate.

Preferably, the cooling of the hot extruded film pneumatically bonded to the substrate in accordance with the present invention is slowed by employing heat carriers such as heated gases or vapors, e.g., super-heated steam, as the pneumatic application means and/or by employing a heated backing roll to support the substrate. Additionally or alternatively, the film coated paper can then be passed through ovens or even heat generating paper corrugators where, if the coated paper has already cooled substantially, the film undergoes what is akin to an annealing. Of course, the extent of the heating which can be usefully employed depends on a number of variables, e.g., the composition and thickness of the film on the substrate, the nature of the substrate, the available heating equipment, etc., but temperatures of the order of about 650° F. at, for instance, the supply to an air knife are not excessive when a medium density polyethylene of average thickness is being applied. It has also been found preferable, particularly at the lowest coating weights, to employ a paper substrate in the method of the invention which has been pre-coated with an adhesion promoter or primer.

For a clearer understanding of the invention, reference should be had to the schematic diagram of a process embodying the present invention which is contained in the attached drawing; and the following example.

EXAMPLE I

Using low, medium, and high density polyethylene, a substrate of paper moving from approximately 70 to approximately 415 ft./min. was coated with extruded plastic films of various coating weights by directing a stream of air issuing from the mouth of an air knife where the temperature and pressure were about 400° F. and 1.5 p.s.i.g, respectively, against that face of the film away from the substrate, thereby enabling the formation of a bond between the other face of the film and the substrate. Next, samples of the thus pneumatically coated paper were tested for their moisture vapor transfer resistance (M.V.T.R.) in a General Foods cabinet held at 100° F. and from 90 to 95% relative humidity in accordance with the recognized testing procedure. Then, the coating weights of previously pressure-rolled, shock-chilled samples of low, medium, and high density polyethylene coated paper having the same M.V.T.R. readings in grams of moisture vapor transferred per 100 square inches of sample per 24 hours were compared with the coating weights of the samples made in accordance with the method of the present invention. The results of this comparison are set forth below in Tables I (low density polyethylene), II (medium density polyethylene), and III (high density polyethylene) wherein columns A show the density of the polyethylene before extrusion and lamination and according to the manufacturer's specification; columns B show the density of the polyethylene on paper after extrusion and lamination in accordance with the present invention and, generally, as depicted in FIGURE 1; columns C show the coating weight of the polyethylene on paper, in pounds per ream, after extrusion and lamination in accordance with the present invention and, generally, as depicted in FIGURE 1; columns D show the M.V.T.R. reading of the polyethylene on paper, in grams of moisture vapor transferred per 100 square inches of sample per 24 hours, after extrusion and lamination in accordance with the present invention and, generally, as depicted in FIGURE 1; columns E show the coating weight of the polyethylene on paper, in pounds per ream, after extrusion and lamination in a method employing pressure-rolling and shock-chilling which gives the same M.V.T.R. reading as that shown in columns D; columns F show the coating weight difference, if any, in pounds of polyethylene per ream of paper between the coating weights of columns C and E giving the M.V.T.R. reading in columns D; and, columns G show the coating weight difference, if any, in percentages between the coating weights of columns C and E giving the M.V.T.R. reading in columns D.

Table I

| Trial | A | B | C | D | E | F | G |
|---|---|---|---|---|---|---|---|
|  | $C_nH_{2n}$ density (gm./cc.) | $C_nH_{2n}$ density (gm./cc.) after claimed bonding | $C_nH_{2n}$ coating wt. (lbs./ream) after claimed bonding | $C_nH_{2n}$ M.V.T.R. (gm./100 in.²/24 hrs.) after claimed bonding | $C_nH_{2n}$ coating wt. (lbs./ream) after prior art bonding | C minus E (lbs./ream) | C minus E (percent) |
| 1 | 0.917 | 0.922 | 16.0 | 0.91 | 21.0 | 5.0 | 23.8 |
| 2 | 0.920 | 0.930 | 15.1 | 0.76 | 24.0 | 8.9 | 37.1 |
| 3 | 0.920 | 0.930 | 13.5 | 0.82 | 23.0 | 9.5 | 41.3 |
| 4 | 0.923 | | 7.6 | 1.72 | 11.2 | 3.6 | 32.1 |
| 5 | 0.920 | 0.930 | 7.2 | 1.70 | 11.4 | 4.2 | 36.8 |
| 6 | 0.920 | 0.929 | 6.8 | 1.82 | 10.6 | 3.8 | 35.8 |
| 7 | 0.923 | | 6.6 | 1.89 | 10.2 | 3.6 | 35.3 |
| 8 | 0.923 | 0.924 | 6.6 | 1.79 | 10.8 | 4.2 | 38.9 |
| 9 | 0.923 | 0.922 | 6.4 | 1.91 | 10.2 | 3.8 | 37.3 |
| 10 | 0.923 | | 6.2 | 1.86 | 10.4 | 4.2 | 40.4 |
| 11 | 0.923 | 0.932 | 5.9 | 1.77 | 11.0 | 5.1 | 46.4 |
| 12 | 0.920 | 0.932 | 5.1 | 2.36 | 8.3 | 3.2 | 38.6 |

Table II

| Trial | A<br>$C_nH_{2n}$<br>density<br>(gm./cc.) | B<br>$C_nH_{2n}$<br>density<br>(gm./cc.)<br>after<br>claimed<br>bonding | C<br>$C_nH_{2n}$<br>coating wt.<br>(lbs./ream)<br>after<br>claimed<br>bonding | D<br>$C_nH_{2n}$<br>M.V.T.R.<br>(gm./100<br>in.²/24 hrs.)<br>after<br>claimed<br>bonding | E<br>$C_nH_{2n}$<br>coating wt.<br>(lbs./ream)<br>after<br>prior art<br>bonding | F<br>C minus E<br>(lbs./ream) | G<br>C minus E<br>(percent) |
|---|---|---|---|---|---|---|---|
| 13 | 0.930 | 0.930 | 14.3 | 0.57 | 22.0 | 7.7 | 35.0 |
| 14 | 0.930 | 0.933 | 10.2 | 0.94 | 13.2 | 3.0 | 22.7 |
| 15 | 0.930 | 0.931 | 8.2 | 1.07 | 11.8 | 3.6 | 30.5 |
| 16 | 0.930 | 0.929 | 8.0 | 1.28 | 10.0 | 2.0 | 20.0 |

Table III

| Trial | A | B | C | D | E | F | G |
|---|---|---|---|---|---|---|---|
| 17 | 0.950 | 0.943 | 14.1 | 0.50 | 23.0 | 8.9 | 38.7 |
| 18 | 0.950 | 0.944 | 13.2 | 0.56 | 17.6 | 6.4 | 32.7 |
| 19 | 0.950 | 0.936 | 7.8 | 0.93 | 12.0 | 4.2 | 35.0 |
| 20 | 0.950 | 0.944 | 7.0 | 1.09 | 11.0 | 4.0 | 36.4 |
| 21 | 0.950 | 0.945 | 6.8 | 1.27 | 10.8 | 4.0 | 37.0 |

What is claimed is:

1. The continuous process of coating a substrate with a film of a compound selected from the group consisting of polymers and copolymers of ethylene, propylene, and butylene consisting essentially of the step of extruding the compound as a film and the step of forming a bond between the substrate and the film solely by blowing a stream of gas selected from the group consisting of air, steam, and inert gases at greater than atmospheric pressure against one side of the film.

2. The process of claim 1 in which the compound is extruded at elevated temperatures.

3. The process of claim 1 in which the compound is extruded and the stream of gas is blown at elevated temperatures.

4. The continuous process of coating a substrate with a film selected from the group consisting of polymers and copolymers of ethylene, propylene, and butylene consisting essentially of the step of extruding the compound as a film, the step of forming a bond between the substrate and the film solely by blowing a stream of a gas selected from the group consisting of air, steam, and inert gases at greater than atmospheric pressure against one side of the film, and the step of heating the film on the substrate.

5. The process of claim 4 in which the compound is extruded at elevated temperatures.

6. The process of claim 5 in which the compound is extruded and the stream of gas is blown at elevated temperatures.

7. A paper substrate coated with a film of a compound selected from the group consisting of polymers and copolymers of ethylene, propylene, and butylene; produced by the process consisting essentially of the step of extruding the compound as a film and the step of forming a bond between the substrate and the film solely by blowing a stream of gas selected from the group consisting of air, steam, and inert gases at greater than atmospheric pressure against one side of the film; and, having improved resistance to the passage of gases and solvents.

8. A paper substrate coated with a film of a compound selected from the group consisting of polymers and copolymers of ethylene, propylene, and butylene; produced by the process consisting essentially of the step of extruding the compound as a film, the step of forming a bond between the substrate and the film solely by blowing a stream of gas selected from the group consisting of air, steam, and inert gases at greater than atmospheric pressure against one side of the film, and the step of heating the film on the substrate; and, having improved resistance to the passage of gases and solvents.

References Cited by the Examiner

UNITED STATES PATENTS

| | | | |
|---|---|---|---|
| 2,252,204 | 8/41 | Reilly | 117—68 |
| 2,258,659 | 10/41 | Mosler | 154—97.5 |
| 2,396,946 | 3/46 | Grupe | 117—65 |
| 2,423,237 | 7/47 | Haslacher | 156—497 |
| 2,795,522 | 6/57 | Johns | 154—102 |
| 2,944,298 | 7/60 | Bernhardt et al. | 156—244 XR |
| 2,955,970 | 10/60 | Rice et al. | 154—102 |
| 3,043,738 | 7/62 | Demeter et al. | 156—229 |
| 3,077,428 | 2/63 | Heuser et al. | 156—244 |

EARL M. BERGERT, *Primary Examiner.*

UNITED STATES PATENT OFFICE
CERTIFICATE OF CORRECTION

Patent No. 3,161,560　　　　　　　　　　　　　　　　December 15, 1964

Leon J. Paquin et al.

It is hereby certified that error appears in the above numbered patent requiring correction and that the said Letters Patent should read as corrected below.

Column 1, line 38, for "of" read -- or --; columns 3 and 4, Table I, columns "F" and "G", for "C minus E", each occurrence, read -- E minus C --; columns 5 and 6, Tables II and III, columns "F" and "G", for "C minus E", each occurrence, read -- E minus C --.

Signed and sealed this 18th day of May 1965.

(SEAL)
Attest:

ERNEST W. SWIDER
Attesting Officer

EDWARD J. BRENNER
Commissioner of Patents